(12) United States Patent
Ninagawa et al.

(10) Patent No.: US 11,985,583 B2
(45) Date of Patent: May 14, 2024

(54) COMMUNICATION CONTROL APPARATUS, COMMUNICATION CONTROL METHOD, AND NON-TRANSITORY STORAGE MEDIUM WITH COMMUNICABILITY INFORMATION UPDATING

(71) Applicants: TOYOTA JIDOSHA KABUSHIKI KAISHA, Toyota (JP); DENSO CORPORATION, Kariya (JP)

(72) Inventors: Yuji Ninagawa, Handa (JP); Satoshi Niwa, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 244 days.

(21) Appl. No.: 17/492,370

(22) Filed: Oct. 1, 2021

(65) Prior Publication Data
US 2022/0110046 A1    Apr. 7, 2022

(30) Foreign Application Priority Data
Oct. 5, 2020   (JP) ................. 2020-168633

(51) Int. Cl.
*H04W 40/24* (2009.01)
*H04W 4/02* (2018.01)
*H04W 4/029* (2018.01)
(52) U.S. Cl.
CPC ......... *H04W 40/248* (2013.01); *H04W 4/027* (2013.01); *H04W 4/029* (2018.02)

(58) Field of Classification Search
CPC ... H04W 40/248; H04W 4/027; H04W 4/029; H04W 88/06; H04W 48/16; H04W 24/02
See application file for complete search history.

(56) References Cited

U.S. PATENT DOCUMENTS

| | | | |
|---|---|---|---|
| 8,024,111 B1 * | 9/2011 | Meadows | G01C 21/3492 340/995.23 |
| 8,938,544 B2 * | 1/2015 | Wakikawa | H04W 48/18 709/200 |
| 9,104,535 B1 * | 8/2015 | Brinkmann | G07C 5/085 |

(Continued)

FOREIGN PATENT DOCUMENTS

JP    2001-309445 A    11/2001

*Primary Examiner* — Tejis Daya
(74) *Attorney, Agent, or Firm* — Oliff PLC

(57) ABSTRACT

A communication control apparatus is configured to store communicability information, configured to control an update of the communicability information, configured to acquire a first route as a scheduled route along which the communication control apparatus moves, configured to control communication with the external device during moving of the communication control apparatus to control the update of the communicability information, based on the first route, the communicability information, and a communication detail requested by the communication control apparatus and the external device, configured to perform communication with the external device, configured to collect data required for the update of the communicability information through communication with the external device, and configured to control the update of the communicability information based on the collected data.

12 Claims, 7 Drawing Sheets

(56) References Cited

U.S. PATENT DOCUMENTS

| | | | |
|---|---|---|---|
| 2010/0191614 A1* | 7/2010 | Tanskanen | G08G 1/0969 |
| | | | 705/26.1 |
| 2010/0332121 A1* | 12/2010 | Okude | G01C 21/3415 |
| | | | 701/533 |
| 2011/0040471 A1* | 2/2011 | Krupadanam | F02D 41/0087 |
| | | | 701/101 |
| 2012/0215432 A1* | 8/2012 | Uyeki | G08G 1/096838 |
| | | | 701/119 |
| 2013/0035850 A1* | 2/2013 | He | G01C 21/3461 |
| | | | 701/425 |
| 2013/0238807 A1 | 9/2013 | Wakikawa et al. | |
| 2015/0281906 A1* | 10/2015 | Tseng | H04L 67/61 |
| | | | 455/456.3 |
| 2017/0018190 A1 | 1/2017 | Yamasaki et al. | |
| 2019/0258467 A1 | 8/2019 | Frantz et al. | |

* cited by examiner

FIG. 2

| LOCATION | TIME | PASSAGE SPEED | COMMUNICABLE SYSTEM | COMMUNICABLE BAND | WEATHER | TRANSMITTING AND RECEIVING ELECTRIC POWER | DIS-CONNECTION RATE | ERROR RATE |
|---|---|---|---|---|---|---|---|---|
| | | | | ... | ... | ... | ... | |
| | | | | | | | | |

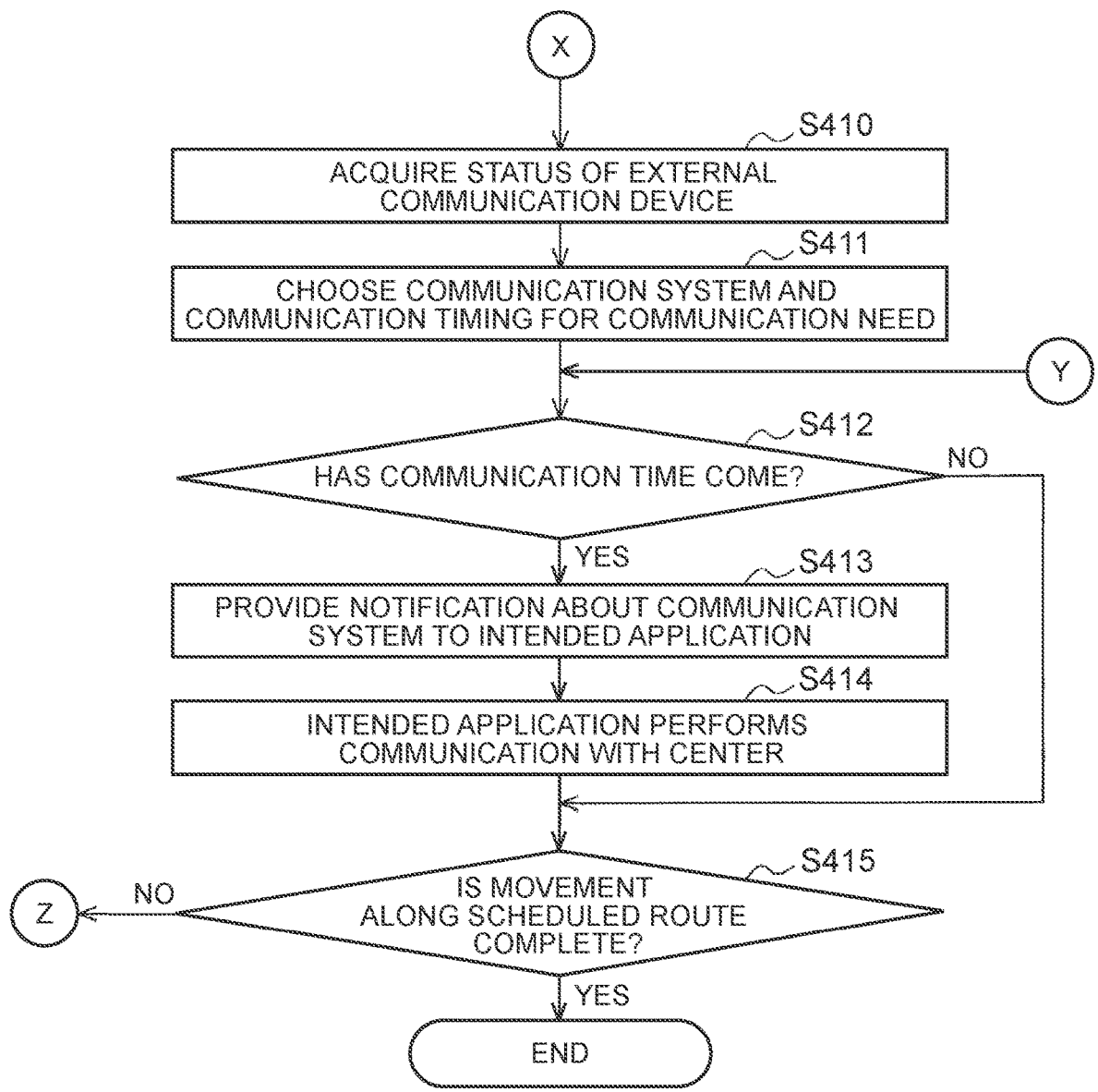

COMMUNICATION CONTROL APPARATUS, COMMUNICATION CONTROL METHOD, AND NON-TRANSITORY STORAGE MEDIUM WITH COMMUNICABILITY INFORMATION UPDATING

CROSS-REFERENCE TO RELATED APPLICATION

This application claims priority to Japanese Patent Application No. 2020-168633 filed on Oct. 5, 2020, incorporated herein by reference in its entirety.

BACKGROUND

1. Technical Field

The disclosure relates to a communication control apparatus, a communication control method, and a non-transitory storage medium.

2. Description of Related Art

In a mobile device equipped with a plurality of communication systems (such as cellular systems (4G/5G) and wireless LANs) as a manner of communication for connecting to networks, such as the Internet, one communication system suitable for a situation in which the mobile device is placed is automatically or manually selected from among the plurality of communication system.

Japanese Unexamined Patent Application Publication No. 2001-309445 (JP 2001-309445 A) describes a technology as one of techniques for automatically selecting a communication system suitable for a situation from among a plurality of communication systems. In this technology, connection information indicating connection priority level, location, moving speed, connectable communication system, and the like is prestored in a database provided in the mobile device. Then, in this technology, a communication system suitable as a manner of connecting to a network is automatically switched based on location information and moving speed information of the mobile device, and the connection information stored in the database.

SUMMARY

As in the case of the technology described in JP 2001-309445 A, for switching the communication system of the mobile device during moving by using the connection information stored in the database, when some portions in the connection information are missing or some details of the connection information are old, information required to switch the communication system may be insufficient or connection to a network in an intended communication system may be difficult. For this reason, it is desirable that the mobile device equipped with a plurality of communication systems be capable of suitably updating the connection information stored in the database even during moving. There is room to study update control over the connection information.

The disclosure provides a communication control apparatus, a communication control method, and a non-transitory storage medium that are capable of suitably updating connection information stored in a database even during moving.

A first aspect of the disclosure relates to a communication control apparatus configured to be connected to an external device by using a plurality of communication systems. The communication control apparatus includes a storage unit configured to store communicability information associating a location with a communication system available at the location out of the communication systems, and the location is a location where the communication control apparatus is connectable to the external device. The communication control apparatus includes an update control unit configured to control an update of the communicability information based on a request from at least one of the communication control apparatus and the external device, an acquisition unit configured to acquire a first route as a scheduled route along which the communication control apparatus moves, a control unit configured to control communication between the communication control apparatus and the external device during moving of the communication control apparatus in order for the update control unit to control the update of the communicability information, based on the first route, the communicability information, and a communication detail requested by the communication control apparatus and the external device, and a communication unit configured to perform communication between the communication control apparatus and the external device in accordance with the control of the control unit. The update control unit is configured to collect data required for the update of the communicability information through communication between the communication control apparatus and the external device and configured to control the update of the communicability information based on the collected data.

In the first aspect, the communication detail may include at least one of a communication location, a passage speed, a communication data amount, a communication system, and weather, and the communication location may indicate one or more portions to be updated in the communicability information. The control unit may be configured to control communication between the communication control apparatus and the external device such that the communication detail is satisfied.

In the first aspect, when a plurality of requests is generated from the communication control apparatus and the external device, the update control unit may be configured to control an update of the communicability information by integrating the requests together.

In the first aspect, when a request is generated from the external device, the update control unit may be configured to transmit update data of the communicability information to the external device, and the communicability information may be generated based on the collected data.

In the first aspect, the external device may be configured to distribute the update data to an apparatus different from the communication control apparatus, and the update data may be received from the update control unit.

In the first aspect, the communication control apparatus may further include a route consideration unit configured to propose a second route different from the first route based on the first route, the communicability information, and the communication detail. The control unit may be configured to, when the control unit determines that the second route satisfies a predetermined condition required for the scheduled route along which the communication control apparatus moves, change the scheduled route from the first route to the second route and control communication between the update control unit and the external device.

In the first aspect, the second route may be a route having a higher efficiency in updating the communicability information than the first route.

In the first aspect, the condition required for the scheduled route may have at least one of arrival time at a destination point of the scheduled route and a moving cost to the destination point.

In the first aspect, in the communicability information, at least one of time, weather, a passage speed, a communication band, an electric power required for communication, a disconnection rate of communication, and an error rate of communication may be further associated with the location together with the communication system.

A second aspect of the disclosure relates to a communication control method that is executed by one or more processors in a computer of a communication control apparatus configured to be connected to an external device by using a plurality of communication systems. The communication control method includes requesting an update of communicability information from at least one of the communication control apparatus and the external device by using the communicability information, the communicability information associating a location with a communication system available at the location out of the communication systems, and the location is a location where the communication control apparatus is connectable to the external device. The communication control method includes acquiring a first route as a scheduled route along which the communication control apparatus moves, controlling communication between the communication control apparatus and the external device during moving of the communication control apparatus in order to control the update of the communicability information, based on the first route, the communicability information, and a communication detail requested by the communication control apparatus and the external device, collecting data required for the update of the communicability information by performing communication between the communication control apparatus and the external device in accordance with the control of communication, and controlling the update of the communicability information based on the collected data.

A third aspect of the disclosure relates to a non-transitory storage medium storing instructions executable on one or more processors in a computer of a communication control apparatus configured to be connected to an external device by using a plurality of communication systems. The instructions cause the one or more processors to execute functions. The functions include requesting an update of communicability information from at least one of the communication control apparatus and the external device by using the communicability information, the communicability information associating a location with a communication system available at the location out of the communication systems, and the location is a location where the communication control apparatus is connectable to the external device. The functions include acquiring a first route as a scheduled route along which the communication control apparatus moves, controlling communication between the communication control apparatus and the external device during moving of the communication control apparatus in order to control the update of the communicability information, based on the first route, the communicability information, and a communication detail requested by the communication control apparatus and the external device, collecting data required for the update of the communicability information by performing communication between the communication control apparatus and the external device in accordance with the control of communication, and controlling the update of the communicability information based on the collected data.

According to the first, second, and third aspects of the disclosure, connection information stored in the database is suitably updated even during moving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a table showing an example of communicability information stored in a communicability database;

FIG. 4B is a flowchart showing the different procedure of communication control to be executed by the communication control apparatus according to the first embodiment.

DETAILED DESCRIPTION OF EMBODIMENTS

A communication control apparatus of the disclosure updates communicability information, stored in the host apparatus, based on a route along which the host apparatus is scheduled to move and requested update details. The communicability information associates a location where the host apparatus is connectable to an external device with at least one communication system available at the location. With this configuration, for example, information of missing portions and portions of old creation dates in the communicability information can be suitably updated even during moving of the host apparatus. Thus, a communication system appropriate for an application implemented in the host apparatus to use in communication with an external device during moving of the host apparatus is accurately estimated in advance based on a scheduled route, the communicability information, and communication details requested by a communication need generated in the application. Therefore, it is possible to avoid, for example, a situation in which the host apparatus is not able to connect to a center at a scheduled location, a situation in which the host apparatus is not able to obtain a desired communication band even when being able to connect to the center, or a situation in which a communication cost to be spent to connect to the center unnecessarily increases.

The communication control apparatus of the disclosure is connectable to the external device by using a plurality of communication systems. Hereinafter, embodiments of the disclosure will be described in detail with reference to the accompanying drawings by giving an example in which the communication control apparatus is mounted on a mobile device, such as a vehicle.

First Embodiment

Configuration

Figure 1:
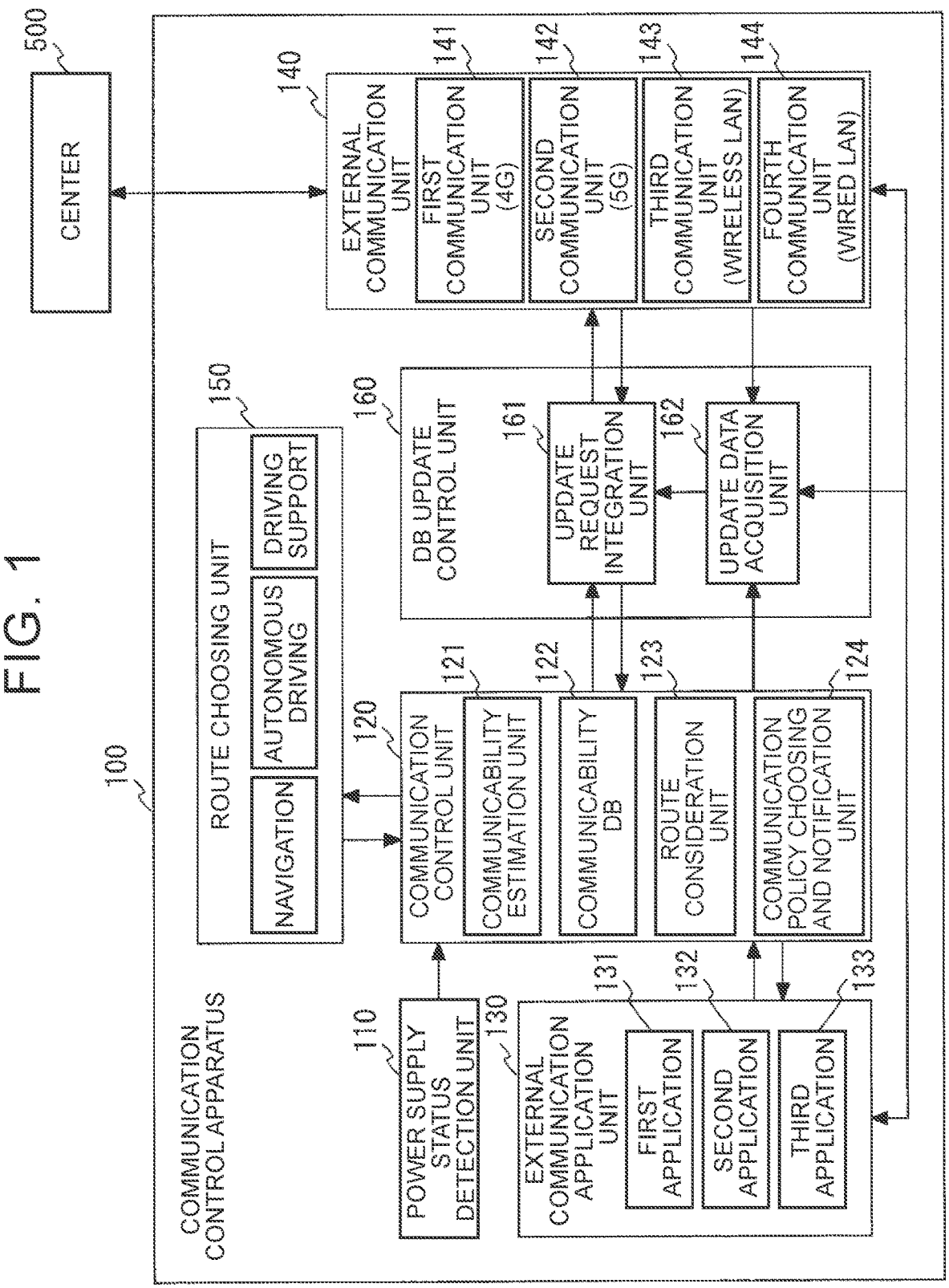
FIG. 1 is a functional block diagram of a communication control apparatus and its peripheral component according to a first embodiment.

FIG. 1 is a functional block diagram of a communication control apparatus 100 and its peripheral component according to a first embodiment of the disclosure. The functional blocks illustrated in FIG. 1 include the communication control apparatus 100 mounted on a vehicle, and a center 500 connected to the communication control apparatus 100. The center 500 is capable of connecting to one or more communication control apparatuses (not shown) other than the communication control apparatus 100.

The center 500 is an external device other than a vehicle. The center 500 communicates with the control apparatus 100 to receive a service of the communication control apparatus 100 or provide its own service to the communication control apparatus 100. The center 500 manages communicability information (described later) provided in the communication control apparatus 100 and is capable of outputting a request to update all or part of a database (hereinafter, center DB update request) regarding the communicability information as needed to the communication control apparatus 100. A center DB update request may be a request generated by the center 500 by itself or may be a request generated by one vehicle connected to the center 500 and transferred to another vehicle. The center 500 may be, for example, a fixed apparatus, such as a server, or may be a mobile terminal, such as a smartphone.

The communication control apparatus 100 includes a power supply status detection unit 110, a communication control unit 120, an external communication application unit 130, an external communication unit 140, a route choosing unit 150, and a database (DB) update control unit 160.

The power supply status detection unit 110 is capable of detecting a current power supply status of the communication control apparatus 100 and is also capable of estimating a future power supply status of the communication control apparatus 100 based on a scheduled route to be output by the route choosing unit 150 (described later). A power supply status of the communication control apparatus 100 is, for example, the amount of electricity in a battery (not shown) built in the communication control apparatus 100 or the state of charge and discharge of the battery. When, for example, the communication control apparatus 100 is mounted on a plug-in hybrid vehicle (PHV), the communication control apparatus 100 is capable of setting "IG state", "+B state", and "PlugIn state" as the state of charge and discharge of the vehicle. The "IG state" is a state where electric power is being generated by a motor generator, and the in-vehicle battery can be charged with electric power. The "+B state" is a state where electric power is not being generated by the motor generator, and the in-vehicle battery is not charged. The "PlugIn state" is a state where electric power is charged from an external plugged-in power supply facility. The power supply status detection unit 110 is capable of detecting a currently available electric power of the communication control apparatus 100 or estimating an available electric power of the communication control apparatus 100 along a scheduled route. The power supply status detection unit 110 outputs information about the power supply status and available electric power of the communication control apparatus 100 to the communication control unit 120.

The external communication application unit 130 includes applications implemented in the communication control apparatus 100 and is capable of performing a predetermined service through communication with the center 500. In the present embodiment, an example in which three applications, that is, a first application 131, a second application 132, and a third application 133, are implemented is shown as the external communication application unit 130. The number of applications to be implemented in the communication control apparatus 100 is not limited thereto.

The external communication application unit 130 outputs, to the communication control unit 120, a data transmission request and/or a data reception request (hereinafter, referred to as communication need) to be generated from one or some of the first application 131, the second application 132, and the third application 133. A communication need contains constraint information on at least one of the amount of data to be communicated (communication data amount), an allowable delay time of communication (allowable communication delay time), whether communication may be interrupted (communication interruption allowability), and an allowable cost for communication (allowable communication cost) as details requested for communication (communication details). The external communication application unit 130 receives, from the communication control unit 120, a notification about the communication system and communication timing of the external communication unit 140, permitted to achieve the communication need. The external communication application unit 130 performs data transmission to the center 500 or data reception from the center 500 via the external communication unit 140 based on the notification received from the communication control unit 120.

An application to upload predetermined data (field data) collected during travel of the vehicle to the center 500 at any time (Field of Test (FOT) application) can be illustrated as one of the applications to be implemented in the external communication application unit 130. An application to download map data of a scheduled travel destination to be used in a navigation to acquire as needed map data required for route guidance, that is, a so-called hybrid navigation, from the center 500 (hybrid navigation application) can be illustrated as one of the applications to be implemented in the external communication application unit 130. An application to upload, for example, data regarding the state of the vehicle to the center 500 (remote service application) can be conceived of as one of the applications to be implemented based on the request from the center 500 in the external communication application unit 130. An application to download an update program for updating software of an ECU or the like from the center 500 (Over The Air (OTA) application) can be illustrated as one of the applications to be implemented in the external communication application unit 130.

The external communication unit 140 is a communication interface for connecting the communication control apparatus 100 to the center 500 directly or via a network. The external communication unit 140 performs communication between the communication control apparatus 100 and the center 500 in accordance with control of the communication control unit 120. The external communication unit 140 of the present embodiment includes, for example, a first communication unit 141 using a cellular 4G communication system, a second communication unit 142 using a cellular 5G communication system, a third communication unit 143 using a wireless LAN communication system, and a fourth communication unit 144 using a wired LAN communication system, as a communication device. The number of communication units provided in the external communication unit 140 and the communication systems handled by the external communication unit 140 are not limited to those illustrated. The external communication unit 140 may output operation information indicating whether each of the first communication unit 141, the second communication unit 142, the third communication unit 143, and the fourth communication unit 144 is normally operating, to the communication control unit 120 or the database update control unit 160.

The route choosing unit 150 is capable of choosing a scheduled route along which the communication control apparatus 100 moves (travels). The route choosing unit 150 includes, for example, a navigation function to perform route guidance to a destination point based on map data, an autonomous driving function that the vehicle executes all driving control, and a driving support function, such as Adaptive Cruise Control (ACC), that the vehicle supports control over part of driving. The route choosing unit 150 outputs information about the scheduled route chosen by these functions (passage locations, a moving speed between passage locations, and the like) to the communication control unit 120. When an alternative route is proposed from the communication control unit 120, the route choosing unit 150 is capable of determining whether to change the current scheduled route to the alternative route based on predetermined conditions determined according to safety and moving needs (arrival time, moving cost, comfort, and the like).

The communication control unit 120 controls communication between the communication control apparatus 100 and the center 500 in order for the application implemented in the external communication application unit 130 executes a predetermined service or to update communicability information (described later) with the database update control unit 160. The communication control unit 120 includes a communicability estimation unit 121, a communicability database (DB) 122, a route consideration unit 123, and a communication policy choosing and notification unit 124.

The communicability database 122 is a storage unit that stores communicability information at least associating a location where the communication control apparatus 100 is connectable to the center 500 with at least one communication system available at the location out of the plurality of communication systems prepared in the external communication unit 140. FIG. 2 is a table showing an example of the communicability information stored in the communicability database 122.

In the communicability information shown in FIG. 2, a passage speed, a communicable system, a communicable band, weather, a transmitting and receiving electric power, a disconnection rate, and an error rate are associated with each time at each location. Examples of the location include points indicated by longitude and latitude (nodes in so-called map data), straight lines connecting two points (links in map data), and regions surrounded by four points (meshes in map data). Time is basically information in hours and minutes and may further include information about date, day of week, or the like. A passage speed is a speed when the communication control apparatus 100 passes through the location. When the location is a straight line or a region, the location may be an instantaneous value of speed at a certain point or may be an average value or maximum value of speed. A communicable system indicates a communication system available to the communication control apparatus 100 under conditions of each time and passage speed at the location. A communicable band indicates a communication band available to the communication control apparatus 100 under conditions of each time, passage speed, and communication system at the location. Weather indicates weather conditions, such as clear conditions, rainy conditions, and snowy conditions, and indicates the weather at the time when each passage speed, communicable system, and communicable band at the location and time are obtained. A transmitting and receiving electric power indicates an electric power that the communication control apparatus 100 is able to transmit and receive under conditions of each time, passage speed, communication system, and weather at the location. A disconnection rate indicates a percentage by which communication between the communication control apparatus 100 and the center 500 is disconnected under conditions of each time, passage speed, communication system, communicable band, weather, and transmitting and receiving electric power at the location. An error rate indicates a percentage by which an error occurs in communication between the communication control apparatus 100 and the center 500 under conditions of each time, passage speed, communication system, communicable band, weather, and transmitting and receiving electric power at the location. The above-described information about weather, a transmitting and receiving electric power, a disconnection rate, and an error rate may be omitted. When the communicability information varies depending on an attachment place of a communication antenna of the communication control apparatus 100, the communicability information may be stored for each attachment place of the communication antenna.

The communicability estimation unit 121 acquires a scheduled route chosen by the route choosing unit 150. The communicability estimation unit 121 estimates communicability along the scheduled route acquired from the route choosing unit 150, based on information about the status of the communication control apparatus 100 (location, speed, and the like), information about conditions around the communication control apparatus 100 (time, weather, and the like), and the communicability information stored in the communicability database 122. Communicability in the present embodiment may be regarded as a communicable system, a communicable band, a transmitting and receiving electric power, a disconnection rate, and an error rate.

The communication policy choosing and notification unit 124 chooses a communication system and communication timing appropriate to achieve a communication need received from the external communication application unit 130 and/or a DB updating communication need received from the database update control unit 160 (described later) based on at least communicability along the scheduled route, estimated by the communicability estimation unit 121 (and additionally operating information output from the external communication unit 140). When there is a plurality of communication needs, the communication policy choosing and notification unit 124 chooses a communication system and communication timing for each communication need based on a priority level or the like assigned in advance to each communication need. The communication policy choosing and notification unit 124 may choose a communication system and communication timing appropriate to achieve a communication need additionally based on a power supply status of the communication control apparatus 100, detected by the power supply status detection unit 110, and an available electric power along the estimated scheduled route. A communication system and communication timing may be chosen not for each communication need and may be chosen for each of the applications (the first application 131, the second application 132, and the third application 133) implemented in the external communication application unit 130. The communication policy choosing and notification unit 124 provides a notification about a communication system for performing a corresponding communication need to the external communication application unit 130 and provides a notification about a communication system for performing a corresponding DB updating communication need to the database update control unit 160 in accordance with the chosen communication system and communication timing.

The route consideration unit 123 considers whether there is a route appropriate to achieve a communication need received from the external communication application unit 130 and/or a DB updating communication need generated by an update request integration unit 161 (described later), other than a current scheduled route already chosen by the route choosing unit 150. This consideration is performed based on a communication data amount, an allowable communication delay time, a communication interruption allowability, an allowable communication cost, and the like, which are communication details requested by the communication need, and a communication location, a passage speed, a communication data amount, a communication system, weather, and the like that are communication details requested by the DB updating communication need. The details of the consideration will be described later. The route consideration unit 123 may consider an item as to whether an electric power can be reduced additionally based on a power supply status of the communication control apparatus 100, detected by the power supply status detection unit 110, and an available electric power along the estimated scheduled route. As a result of consideration of a route, when there is an appropriate alternative route other than the scheduled route, the route consideration unit 123 proposes a change to the alternative route to the route choosing unit 150.

The route consideration unit 123 is capable of determining whether the communicability information stored in the communicability database 122 needs to be updated. Determination that the communicability information needs to be updated may be performed when, for example, a missing portion in the communicability information is extracted or an old portion elapsed for a predetermined period from a creation date is extracted, based on a communication need received from the external communication application unit 130. The route consideration unit 123 outputs a request to update all or part of the database concerned with portions in the communicability information, determined to need to be updated (hereinafter, referred to as local DB update request) to the database update control unit 160.

The database update control unit 160 controls a process related to an update of the communicability information stored in the communicability database 122 of the communication control unit 120. The database update control unit 160 includes an update request integration unit 161 and an update data acquisition unit 162.

The update request integration unit 161 receives one or both of a local DB update request output from the route consideration unit 123 and a center DB update request output from the center 500. When there is a plurality of DB update requests, the update request integration unit 161 integrates those DB update requests and generates a DB updating communication need. A DB updating communication need contains constraint information about at least one of a communication location, time, a passage speed, a communication data amount, a communication system, a communication band, a power supply status, and weather at the location, indicating a portion to be updated in the communicability information. The generated DB updating communication need is output to the communication control unit 120. The update request integration unit 161 acquires DB update data generated based on information acquired by the update data acquisition unit 162 through communication with the center 500 based on the DB updating communication need. The update request integration unit 161 outputs the acquired DB update data to a request source from which the DB update request is generated. More specifically, the update request integration unit 161 outputs the acquired DB update data to the communication control unit 120 for a local DB update request and outputs the acquired DB update data to the center 500 for a center DB update request.

The update data acquisition unit 162 receives, from the communication control unit 120, a notification about the communication system and communication timing of the external communication unit 140, permitted to achieve the DB updating communication need. The update data acquisition unit 162 performs data transmission to the center 500 or data reception from the center 500 via the external communication unit 140 based on the notification received from the communication control unit 120. In performing the communication, the update data acquisition unit 162 collects data required to update information related to communicability, such as a communicable band, a disconnection rate, and an error rate. The update data acquisition unit 162 generates DB update data for updating the communicability information stored in the communicability database 122 based on the collected data. The generated DB update data is output to the update request integration unit 161.

Part or all of the communication control apparatus 100 can be typically made up of an electronic control unit (ECU) including a processor, such as a microcontroller, a memory, an input/output interface, and the like. The electronic control unit is capable of implementing part or all of the functions, that is, the power supply status detection unit 110, the communication control unit 120, the external communication application unit 130, the external communication unit 140, the route choosing unit 150, and the database update control unit 160, by the processor reading a program stored in a non-transitory storage medium such as the memory and running the program.

Control

Next, control to be executed by the communication control apparatus 100 of the present embodiment will be described further with reference to FIG. 3A, FIG. 3B, FIG. 4A, and FIG. 4B.

Figure 3A:
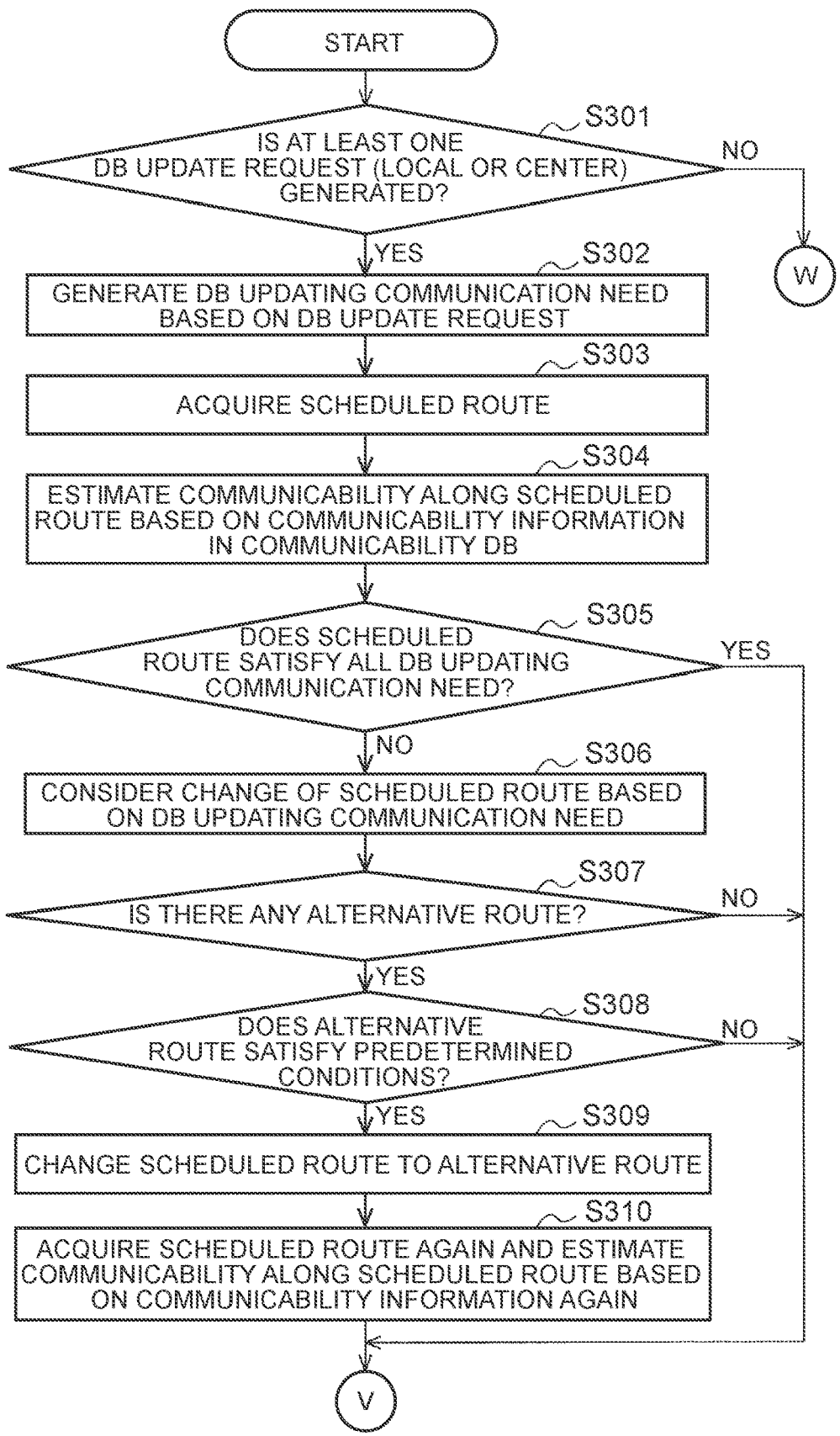
FIG. 3A is a flowchart showing a procedure of communication control to be executed by the communication control apparatus according to the first embodiment.
Figure 3B:
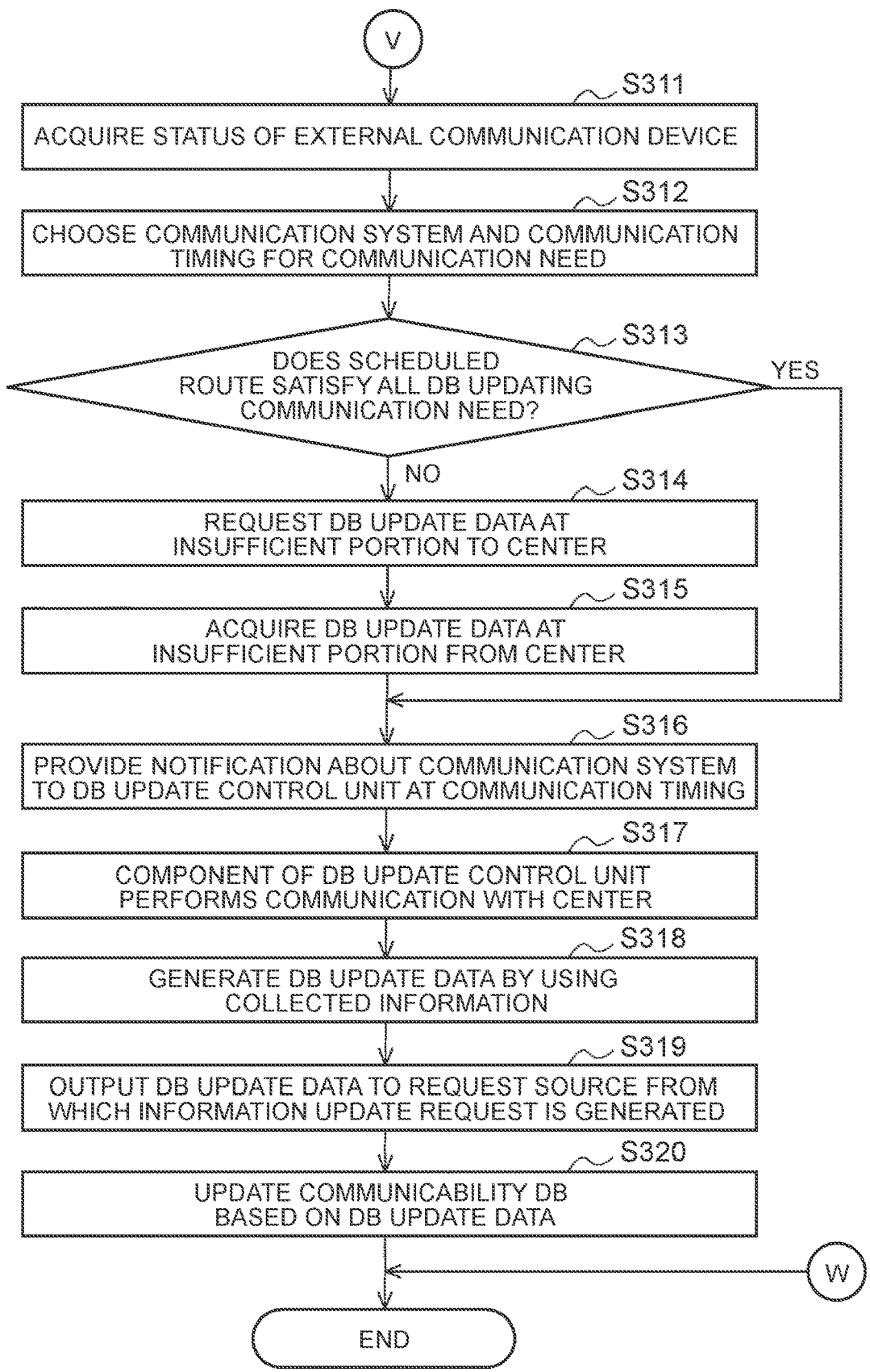
FIG. 3B is a flowchart showing the procedure of communication control to be executed by the communication control apparatus according to the first embodiment.

FIG. 3A and FIG. 3B are flowcharts showing a procedure of communication control to be executed by the communication control apparatus 100 when a request to update the communicability information stored in the communicability database 122 is generated. The process of FIG. 3A and the process of FIG. 3B are connected by connectors V, W.

Communication control shown in FIG. 3A and FIG. 3B is started when, for example, the route choosing unit 150 chooses a scheduled route along which the communication control apparatus 100 is scheduled to move. The communication control may be repeatedly executed until movement of the communication control apparatus 100 along the scheduled route ends.

Step S301

The database update control unit 160 determines whether at least one of the local DB update request from the communication control unit 120 and the center DB update request from the center 500 is generated. When at least one of the DB update requests is generated (YES in S301), the process proceeds to step S302. When any of the DB update requests is not generated (NO in S301), the communication control ends.

Step S302

The update request integration unit 161 of the database update control unit 160 generates a DB updating communication need for updating the communicability information stored in the communicability database 122 based on the generated DB update request. When a plurality of DB update requests is generated, the update request integration unit 161 generates one DB updating communication need in which the plurality of DB update requests is integrated. The generated DB updating communication need is output to the communication control unit 120. When the DB updating communication need is generated, the process proceeds to step S303.

Step S303

When the communication control unit 120 receives the DB updating communication need from the database update control unit 160, the communicability estimation unit 121 acquires the scheduled route (first route) chosen by the route choosing unit 150 from the route choosing unit 150. When the scheduled route (first route) is acquired, the process proceeds to step S304.

Step S304

The communicability estimation unit 121 of the communication control unit 120 estimates communicability (a communicable system, a communicable band, and the like) at each location along the scheduled route (first route) chosen by the route choosing unit 150 based on the communicability information stored in the communicability database 122. When estimation of communicability along the scheduled route (first route) is complete, the process proceeds to step S305.

Step S305

The communicability estimation unit 121 of the communication control unit 120 determines whether all the DB updating communication need received from the database update control unit 160 is satisfied when the communication control apparatus 100 moves along the scheduled route (first route) based on the estimated communicability along the scheduled route (first route). When all the DB updating communication need is satisfied (YES in S305), the process proceeds to step S311. When all the DB updating communication need is not satisfied (NO in S305), the process proceeds to step S306.

Step S306

The route consideration unit 123 of the communication control unit 120 considers a change of the scheduled route (first route) based on the scheduled route (first route) chosen by the route choosing unit 150, the DB updating communication need received from the database update control unit 160, and the communicability information stored in the communicability database 122. Specifically, the route consideration unit 123 considers whether there is an alternative route (second route) that satisfies communication details (a communication location, a passage speed, a communication data amount, a communication system, weather, and the like) requested by the DB updating communication need more than the current scheduled route (first route). Here, a high update efficiency case can be illustrated as a case where a request for the DB updating communication need is more satisfied. Examples of the high update efficiency case include a case where the communication control apparatus 100 is less likely to pass along the scheduled route (first route) at a requested speed but the communication control apparatus 100 is more likely to pass along the alternative route (second route) in the same mesh at the requested speed. Information such as map data required to consider a route change may be acquired from the route choosing unit 150, may be held by the route consideration unit 123 in itself, or may be acquired from another component. When consideration of a change of the scheduled route (first route) is complete, the process proceeds to step S307.

Step S307

The route consideration unit 123 of the communication control unit 120 determines whether there is an alternative route (second route) as a result of consideration of a change of the scheduled route (first route). The number of alternative routes (second routes) may be one or two or more. When there is an alternative route that is the second route (YES in S307), the process proceeds to step S308. The alternative route (second route) is output to the route choosing unit 150, and a change of the scheduled route (first route) is proposed. On the other hand, when there is no alternative route that is the second route (NO in S307), the process proceeds to step S311.

Step S308

The route choosing unit 150 determines whether the alternative route (second route) proposed by the communication control unit 120 satisfies predetermined conditions required for the current scheduled route (first route). Examples of the predetermined conditions may include desired arrival time at a destination point, a moving cost (fuel fee, toll road fee, or the like) of getting to a destination point and comfort (presence or absence of a traffic jam, presence or absence of a mountain road, or the like). When the alternative route (second route) satisfies the predetermined conditions (YES in S308), the process proceeds to step S309. When the alternative route (second route) does not satisfy the predetermined conditions (NO in S308), the process proceeds to step S311.

Step S309

The route choosing unit 150 changes the scheduled route of the communication control apparatus 100 from the currently chosen scheduled route (first route) to the alternative route (second route). When the scheduled route is changed, the process proceeds to step S310.

Step S310

The communicability estimation unit 121 of the communication control unit 120 acquires the changed scheduled route (second route) again from the route choosing unit 150. The communicability estimation unit 121 estimates communicability at each location along the scheduled route (second route) based on the communicability information stored in the communicability database 122. When re-estimation of communicability along the scheduled route (second route) is complete, the process proceeds to step S311.

Step S311

The communication policy choosing and notification unit 124 of the communication control unit 120 acquires the status of the external communication unit 140. The status of the external communication unit 140 is information indicating whether each of the first communication unit 141, the second communication unit 142, the third communication unit 143, and the fourth communication unit 144 is in an available state. Examples of an unavailable state include a failure of the communication unit and no supply of electric power to the communication unit. When the status of the external communication unit 140 is acquired, the process proceeds to step S312.

Step S312

The communication policy choosing and notification unit 124 of the communication control unit 120 chooses a communication policy indicating a communication system and communication timing for the DB updating communication need received from the database update control unit 160 based on the communicability along the scheduled route (the first route or the second route) estimated by the communicability estimation unit 121 and the status of the external communication unit 140. Examples of the communication policy may include details in which a wireless LAN communication system via the third communication unit 143 is used at the timing of passing through position P1 and a cellular 5G communication system via the first communication unit 141 is used at the timing of passing through position P2 for a communication need N. When the communication policy is chosen, the process proceeds to step S313.

Step S313

The communicability estimation unit 121 of the communication control unit 120 determines whether all the DB updating communication need received from the database update control unit 160 is satisfied when the communication control apparatus 100 moves along the scheduled route (first route) based on the estimated communicability along the scheduled route (the first route or the second route). When all the DB updating communication need is satisfied (YES in S313), the process proceeds to step S316. When all the DB updating communication need is not satisfied (NO in S313), the process proceeds to step S314.

Step S314

The communicability estimation unit 121 of the communication control unit 120 requests DB update data at a missing portion to the center 500 via the database update control unit 160 and the external communication unit 140 as a result of the fact that the DB updating communication need is not satisfied. When the center 500 receives the request, the center 500, for example, collects DB update data of the missing portion by using a communication control apparatus mounted on another vehicle. When the DB update data of the missing portion is requested to the center 500, the process proceeds to step S315.

Step S315

The update data acquisition unit 162 of the database update control unit 160 acquires the DB update data of the missing portion from the center 500 via the external communication unit 140. When the DB update data of the missing portion is acquired from the center 500, the process proceeds to step S316.

Step S316

The communication policy choosing and notification unit 124 of the communication control unit 120 provides the communication system to be performed at the communication timing indicated by the chosen communication policy to the update data acquisition unit 162 of the database update control unit 160. When the communication system is provided to the update data acquisition unit 162, the process proceeds to step S317.

Step S317

The update data acquisition unit 162 of the database update control unit 160 performs communication with the center 500 by using the communication system provided from the communication control unit 120. Specifically, the update data acquisition unit 162 requests communication with the center 500 using the communication system provided from the communication control unit 120 to the external communication unit 140, and the external communication unit 140 achieves communication between the update data acquisition unit 162 and the center 500 in response to the request. When communication between the update data acquisition unit 162 and the center 500 is performed, the process proceeds to step S318.

Step S318

The update data acquisition unit 162 of the database update control unit 160 generates DB update data that is part or all of the communicability information to be updated, based on the information (the communicable band, the disconnection rate, the error rate, and the like) collected through communication with the center 500. When the DB update data is generated, the process proceeds to step S319.

Step S319

The update request integration unit 161 of the database update control unit 160 outputs the DB update data generated by the update data acquisition unit 162 to the request source from which the DB update request is generated. Specifically, the update request integration unit 161 outputs the DB update data to the communication control unit 120 when the DB update request is a local DB update request generated from the communication control unit 120 of the host vehicle or outputs (transmits) the DB update data to the center 500 when the DB update request is a center DB update request generated from the center 500. When the DB update data is output to the request source of the DB update request, the process proceeds to step S320.

Step S320

The request source from which the DB update request is generated updates the communicability information stored in the communicability database 122 based on the DB update data acquired from the database update control unit 160. Specifically, when the DB update request is a local DB update request, the communication control unit 120 updates the communicability information stored in the communicability database 122 held in itself based on the DB update data acquired from the database update control unit 160. On the other hand, when the DB update request is a center DB update request, the center 500 outputs the DB update data acquired from the database update control unit 160 to a specific vehicle that is a request source for updating the database (a vehicle different from the vehicle in which the DB update data is generated), and the communication control apparatus 100 of the specific vehicle updates its own communicability information based on the DB update data acquired from the center 500. The center 500 may output the DB update data acquired from the database update control unit 160 to all the connectable vehicles. In this case, the communication control apparatus 100 of each vehicle updates its own communicability information based on the DB update data acquired from the center 500. Thus, the process of the communication control ends.

Figure 4A:
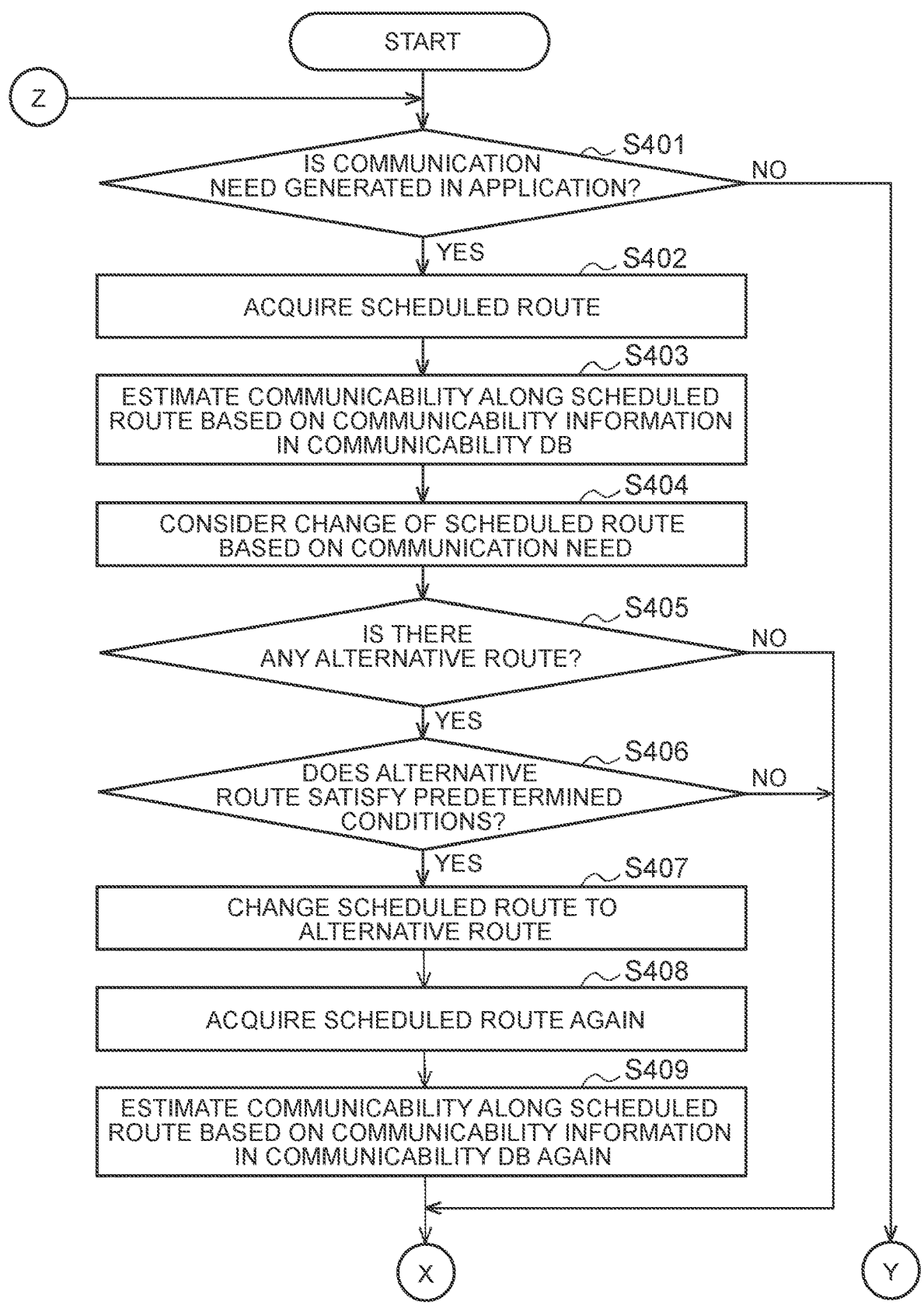
FIG. 4A is a flowchart showing a different procedure of communication control to be executed by the communication control apparatus according to the first embodiment.

FIG. 4A and FIG. 4B are flowcharts showing a procedure of communication control to be executed by the communication control apparatus 100 when a request for the external communication application unit 130 to communicate with the center 500 is generated. The process of FIG. 4A and the process of FIG. 4B are connected by connectors X, Y, Z.

Communication control shown in FIG. 4A and FIG. 4B is started when, for example, the route choosing unit 150 chooses a scheduled route along which the communication control apparatus 100 is scheduled to move. Communication control shown in FIG. 4A and FIG. 4B is basically performed independently of communication control shown in FIG. 3A and FIG. 3B.

Step S401

The external communication application unit 130 determines whether one or a plurality of new communication needs is generated in the first application 131, the second application 132, and the third application 133. When a new communication need is generated (YES in S401), the process proceeds to step S402. The generated communication need is output to the communication control unit 120. On the other hand, when a new communication need is not generated (NO in S401), the process proceeds to step S412.

Step S402

When the communication control unit 120 receives the communication need from the external communication application unit 130, the communicability estimation unit 121 acquires the scheduled route (first route) chosen by the route choosing unit 150 from the route choosing unit 150. When the scheduled route (first route) is acquired, the process proceeds to step S403.

Step S403

The communicability estimation unit 121 of the communication control unit 120 estimates communicability (a communicable system, a communicable band, and the like) at each location along the scheduled route (first route) chosen by the route choosing unit 150 based on the communicability information stored in the communicability database 122. When estimation of communicability along the scheduled route (first route) is complete, the process proceeds to step S404.

Step S404

The route consideration unit 123 of the communication control unit 120 considers a change of the scheduled route (first route) based on the scheduled route (first route) chosen by the route choosing unit 150, the communication need generated by the external communication application unit 130, and the communicability information stored in the communicability database 122. Specifically, the route consideration unit 123 considers whether there is an alternative route (second route) that satisfies communication details (a communication data amount, an allowable communication delay time, a communication interruption allowability, and an allowable communication cost) requested by the communication need more than the current scheduled route (first route). Here, a high communication efficiency case can be illustrated as a case where a request for the communication need is more satisfied. Examples of the high communication efficiency case include a case where a communication cost is reduced because the alternative route (second route) passes through a location where a wireless LAN is available although the scheduled route (first route) does not pass through a location where a wireless LAN is available and a case where the alternative route (second route) allows communication in a shorter delay time although the scheduled route (first route) also satisfies the allowable communication delay time. Information such as map data required to consider a route change may be acquired from the route choosing unit 150, may be held by the route consideration unit 123 in itself, or may be acquired from another component. When consideration of a change of the scheduled route (first route) is complete, the process proceeds to step S405.

Step S405

The route consideration unit 123 of the communication control unit 120 determines whether there is an alternative route (second route) as a result of consideration of a change of the scheduled route (first route). The number of alternative routes (second routes) may be one or two or more. When there is an alternative route (second route), the process proceeds to step S406. The alternative route (second route) is output to the route choosing unit 150, and a change of the scheduled route (first route) is proposed. On the other hand, when there is no alternative route (second route) (NO in S405), the process proceeds to step S408.

Step S406

The route choosing unit 150 determines whether the alternative route (second route) proposed by the communication control unit 120 satisfies predetermined conditions required for the current scheduled route (first route). Examples of the predetermined conditions may include desired arrival time at a destination point, a moving cost (fuel fee, toll road fee, or the like) of getting to a destination point and comfort (presence or absence of a traffic jam, presence or absence of a mountain road, or the like). When the alternative route (second route) satisfies the predetermined conditions (YES in S406), the process proceeds to step S407. When the alternative route (second route) does not satisfy the predetermined conditions (NO in S406), the process proceeds to step S408. Step S407

The route choosing unit 150 changes the scheduled route of the communication control apparatus 100 from the currently chosen scheduled route (first route) to the alternative route (second route). When the scheduled route is changed, the process proceeds to step S408.

Step S408

The communicability estimation unit 121 of the communication control unit 120 acquires the changed scheduled route (second route) again from the route choosing unit 150. When the scheduled route (second route) is acquired again, the process proceeds to step S409.

Step S409

The communicability estimation unit 121 of the communication control unit 120 estimates again communicability at each location along the scheduled route (second route) based on the communicability information stored in the communicability database 122. When re-estimation of communicability along the scheduled route (second route) is complete, the process proceeds to step S410.

Step S410

The communication policy choosing and notification unit 124 of the communication control unit 120 acquires the status of the external communication unit 140. The status of the external communication unit 140 is information indicating whether each of the first communication unit 141, the second communication unit 142, the third communication unit 143, and the fourth communication unit 144 is in an available state. Examples of an unavailable state include a failure of the communication unit and no supply of electric power to the communication unit. When the status of the external communication unit 140 is acquired, the process proceeds to step S411.

Step S411

The communication policy choosing and notification unit 124 of the communication control unit 120 chooses a communication policy indicating a communication system and communication timing for the communication need generated by the external communication application unit 130 based on communicability along the scheduled route (the first route or the second route) estimated by the communicability estimation unit 121 and the status of the external communication unit 140. Examples of the communication policy may include details in which a wireless LAN communication system via the third communication unit 143 is used at the timing of passing through position P1 and a cellular 5G communication system via the first communication unit 141 is used at the timing of passing through position P2 for a communication need N. When the communication policy is chosen, the process proceeds to step S412.

Step S412

The communication policy choosing and notification unit 124 of the communication control unit 120 determines whether the communication timing indicated by the chosen communication policy has come. When the communication timing has come (YES in S412), the process proceeds to step S413. When the communication timing has not come (NO in S412), the process proceeds to step S415.

Step S413

The communication policy choosing and notification unit 124 of the communication control unit 120 provides the communication system to be performed at the communication timing determined in step S412 to an intended application in the external communication application unit 130. When the communication system is provided to the intended application, the process proceeds to step S414.

Step S414

The intended application of the external communication application unit 130 performs communication with the center 500 by using the communication system provided from the communication control unit 120. Specifically, the intended application requests communication with the center 500 using the communication system provided from the communication control unit 120 to the external communication unit 140, and the external communication unit 140 achieves communication between the intended application and the center 500 in response to the request. When communication between the intended application and the center 500 is performed, the process proceeds to step S415.

Step S415

The route choosing unit 150 determines whether movement of the communication control apparatus 100 along the scheduled route (the first route or the second route) is complete. Completion of movement includes a case where the communication control apparatus 100 cancels movement along the scheduled route, a case where the communication control apparatus 100 arrives at a destination point of the scheduled route, and the like. When movement of the scheduled route is not complete (NO in S415), the process proceeds to step S401. When movement of the scheduled route is complete (YES in S415), the process of the communication control ends.

Here, a request to update the communicability information stored in the communicability database 122 (FIG. 3A, S301) and a request for the external communication application unit 130 to communicate with the center 500 (FIG. 4A, S401) can be generated at the same time. When the requests are generated at the same time in this way, it is desirable that the route consideration unit 123 consider a change to an alternative route by giving priority to the communication need based on the request from the external communication application unit 130 (step S306 in FIG. 3A, step S404 in FIG. 4A) and the communication policy choosing and notification unit 124 choose the communication policy indicating the communication system and the communication timing by giving priority to the communication need based on the request from the external communication application unit 130 (step S312 in FIG. 3B, step S411 in FIG. 4B).

As described above, when the communication control apparatus 100 uses a scheduled route to move, the communication control apparatus 100 is able to highly accurately estimate in advance a communication system available in communication with the center 500 to execute a service provided by an application or to update information in a database. Thus, it is possible to prevent occurrence of inconvenience, such as when a future communication system estimated based on a current situation cannot be used (connected) or an estimated future communication band cannot be obtained.

SPECIFIC EXAMPLES

Next, some specific examples of communication control that the communication control apparatus 100 executes when a request to update the communicability information stored in the communicability database 122 is generated will be described.

(1) Example of Periodical Local DB Update Request

When the power of the communication control apparatus 100 is turned on, the communication control unit 120 searches the communicability information (a communicable band, a disconnection rate, an error rate, weather, and the like according to time and a passage speed) stored in the communicability database 122 and extracts a portion required to be updated. Examples of a portion required to be updated may include a portion where information is insufficient due to non-collection or the like and a portion where an expiry date (for example, half year) of information has passed. The communication control unit 120 outputs a local DB update request related to the extracted portion required to be updated to the database update control unit 160.

The database update control unit 160 generates a DB updating communication need based on the local DB update request. The DB updating communication need contains constraint information including a transmission data amount (for example, 1 MB) to the center 500, a reception data amount (for example, 1 MB) from the center 500, a specific location (for example, intersection) on a map, a passage speed (for example, lower than 10 km/h) at that location, a communication device (for example, wireless LAN) used at that location, and weather (for example, rainy conditions) at that location as communication details to be requested. The generated DB updating communication need is output to the communication control unit 120.

The communicability estimation unit 121 estimates, based on the communicability information stored in the communicability database 122, that the weather at the specific location is more likely to be rainy and the communication control apparatus 100 is less likely to be able to pass through the location at a speed lower than 10 km/h along the current scheduled route for the DB updating communication need received from the database update control unit 160.

The route consideration unit 123 considers a route that satisfies the communication details requested by the DB updating communication need more than the scheduled route based on the communicability information stored in the communicability database 122 and derives an alternative route along which the communication control apparatus 100 is more likely to be able to pass through the specific location in rainy conditions at a speed lower than 10 km/h. As an example, a scheduled route is a route along which the vehicle travels on a priority road of a main trunk and passes through a specific intersection, whereas an alternative route is a route along which the vehicle travels on a non-priority road, temporarily stops, and passes through a specific intersection.

The route choosing unit 150 checks whether the alternative route derived by the route consideration unit 123 satisfies predetermined conditions (safety, desired arrival time at a destination point, and the like) required for the current scheduled route. The case of this example satisfies the predetermined conditions, so the route choosing unit 150 changes the scheduled route to the alternative route.

The communication policy choosing and notification unit 124 chooses a communication policy in which a time point approaching the intersection is set for the communication timing and a wireless LAM is set for the communication system, based on the changed scheduled route (alternative route) and the communication details requested by the DB updating communication need. The communication policy choosing and notification unit 124 provides a notification to the database update control unit 160 at the timing at which the communication control apparatus 100 moves along the scheduled route and stops at the intersection (or the speed of the vehicle becomes lower than 10 km/h within the intersection) in accordance with the chosen communication policy such that the database update control unit 160 performs data transmission and reception with the center 500 through connection via the wireless LAN.

When the database update control unit 160 receives the notification from the communication policy choosing and notification unit 124 at the intersection, the database update control unit 160 requests the third communication unit 143 to transmit data to the center 500 and receive data from the center 500 through wireless LAN communication in response to the notification. The database update control unit 160 collects a communicable band, a disconnection rate, an error rate, and the like during the data communication.

The update data acquisition unit 162 of the database update control unit 160 generates DB update data based on the information collected through wireless LAN communication with the center 500 and outputs the DB update data to the update request integration unit 161 of the database update control unit 160. The update request integration unit 161 outputs the DB update data input from the update data acquisition unit 162 to the communication control unit 120 from which the local DB update request is generated. The communication control unit 120 updates the communicability information stored in the communicability database 122 based on the DB update data.

(2) Example in which Host Vehicle Receives Center DB Update Request from Center for Hybrid Navigation of Another Vehicle When the communication control apparatus 100 of a vehicle α needs map data of a region in which the vehicle α is scheduled to travel in the future in using a hybrid navigation, a communication need is generated from the center 500 to request the hybrid navigation application for data reception. The communication need contains constraint information including, for example, a map data amount (for example, 100 MB) of a scheduled travel region, an allowable communication delay time (for example, 30 minutes) calculated from scheduled arrival time at the scheduled travel region, a communication interruption allowability (for example, interruption is allowed) derived from the properties of the application, and an allowable communication cost (for example, a standard cost by which communication of cellular and Wi-Fi is available) as communication details to be requested.

The communicability estimation unit 121 of the vehicle α estimates communicability along the current scheduled route based on the communicability information stored in the communicability database 122. However, information of some portions needed for estimation is insufficient in the communicability information, so the communication control unit 120 of the vehicle α requests the center 500 to transmit update data of the portions where the information is insufficient.

The center 500 transmits a center DB update request to request update data of the portions where the information is insufficient to at least one vehicle β different from the vehicle α in response to the request from the communication control apparatus 100 of the vehicle α. The vehicle β is appropriately selected from among a plurality of vehicles communicably connected to the center 500 based on various conditions, such as conditions that the vehicle β is capable of using communication systems equivalent to those of the vehicle α, conditions that the vehicle β has the same antenna configuration as that of the vehicle α, conditions that the vehicle β already has information of the insufficient portions, and conditions that the vehicle β is at a location where the vehicle β is able to easily acquire information of the insufficient portions.

When the database update control unit 160 of the vehicle β receives the center DB update request from the center 500, the database update control unit 160 of the vehicle β generates a DB updating communication need based on the center DB update request. The DB updating communication need contains constraint information including a transmission data amount (for example, 1 MB) to the center 500, a reception data amount (for example, 1 MB) from the center 500, a specific location (for example, alleys B, C in an urban area A) on a map, a passage speed (for example, lower than 40 km/h) at that location, a communication device (for example, cellular 5G) used at that location, and weather (for example, clear conditions) at that location as communication details to be requested. The generated DB updating communication need is output to the communication control unit 120 of the vehicle β.

The communicability estimation unit 121 of the vehicle β estimates that cellular 5G communication is possible in the alley B in the urban area A for the DB updating communication need received from the database update control unit 160 of the vehicle β based on the communicability information stored in the communicability database 122.

The route consideration unit 123 of the vehicle β considers a route that satisfies the communication details requested by the DB updating communication need more than the scheduled route based on the communicability information stored in the communicability database 122 and determines that there is no alternative route better than the scheduled route.

The communication policy choosing and notification unit 124 of the vehicle chooses a communication policy in which a time point approaching the alley B in the urban area A is set for the communication timing and cellular 5G is set for the communication system, based on the scheduled route and the communication details requested by the DB updating communication need. The communication policy choosing and notification unit 124 of the vehicle provides a notification to the database update control unit 160 at the timing at which the communication control apparatus 100 of the vehicle β moves along the scheduled route and reaches the alley B in the urban area A in accordance with the chosen communication policy such that the database update control unit 160 performs data transmission and reception with the center 500 through connection via the cellular 5G.

When the database update control unit 160 of the vehicle β receives the notification from the communication policy choosing and notification unit 124 of the vehicle β at the alley B in the urban area A, the database update control unit 160 of the vehicle β requests the second communication unit 142 of the vehicle to transmit data to the center 500 and receive data from the center 500 through cellular 5G communication in response to the notification. The database update control unit 160 of the vehicle collects a communicable band, a disconnection rate, an error rate, and the like during the data communication.

The update data acquisition unit 162 of the database update control unit 160 of the vehicle β generates DB update data based on the information collected through cellular 5G communication with the center 500 and outputs the DB update data to the update request integration unit 161 of the database update control unit 160 of the vehicle β. The update request integration unit 161 of the vehicle β outputs the DB update data input from the update data acquisition unit 162 to the center 500 from which the center DB update request is generated.

The center 500 transmits the DB update data, received from the communication control apparatus 100 of the vehicle β, to the communication control apparatus 100 of the vehicle α from which a request to transmit update data of portions in which the information is insufficient is generated.

The communication control unit 120 of the vehicle α updates the communicability information stored in the communicability database 122 of the vehicle α based on the DB update data received from the center 500. Thus, the communicability estimation unit 121 of the vehicle α is able to estimate communicability along the current scheduled route based on the communicability information stored in the communicability database 122.

As is apparent from the specific examples, with the communication control apparatus according to the present embodiment, the communicability information stored in the database can be suitably updated even during moving.

Second Embodiment

Figure 5:
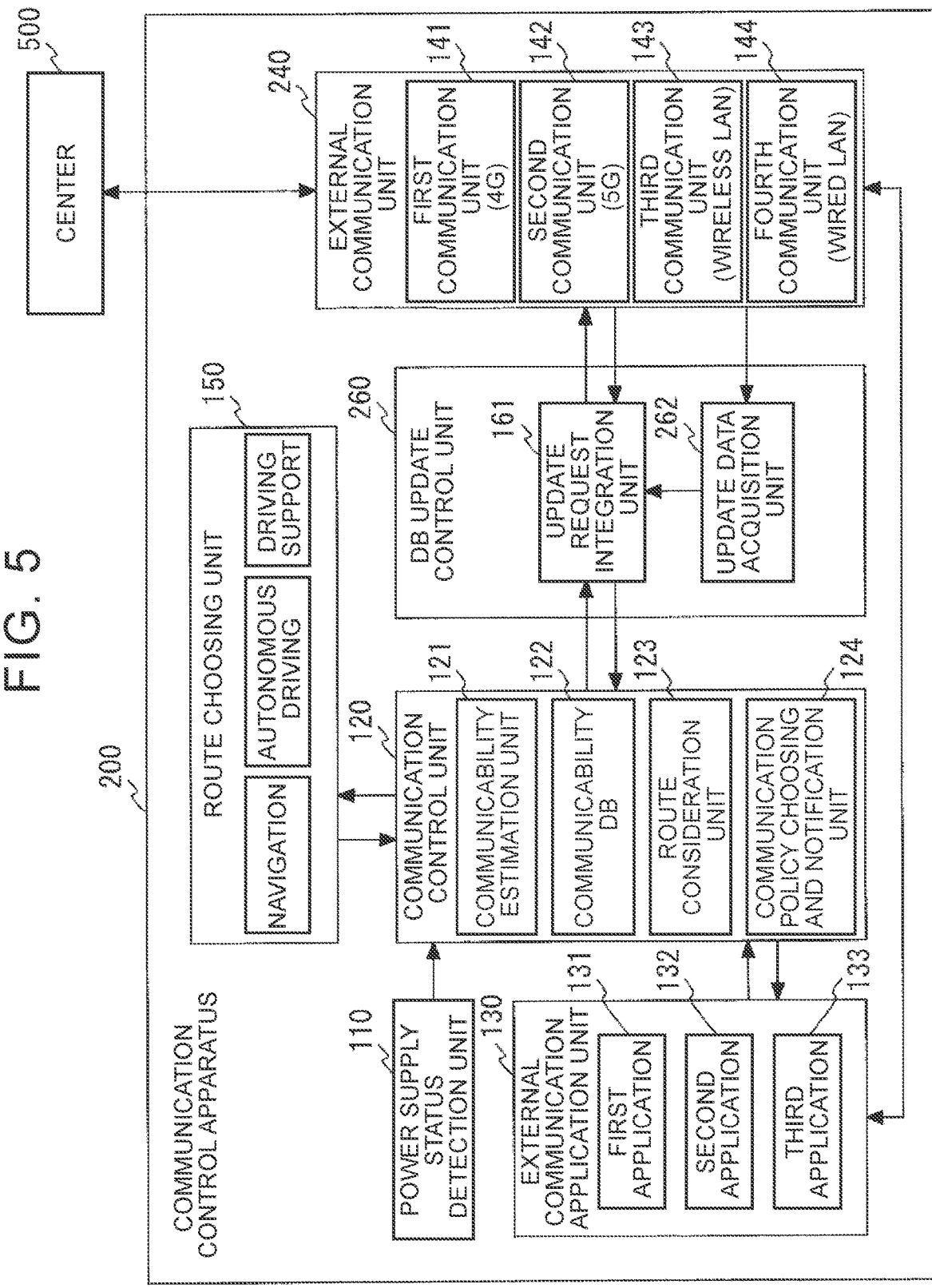
FIG. 5 is a functional block diagram of a communication control apparatus and its peripheral component according to a second embodiment.

FIG. 5 is a functional block diagram of a communication control apparatus 200 and its peripheral component according to a second embodiment of the disclosure. The functional blocks illustrated in FIG. 5 include the communication control apparatus 200 mounted on a vehicle, and the center 500.

The communication control apparatus 200 according to the second embodiment shown in FIG. 5 differs from the communication control apparatus 100 according to the first embodiment shown in FIG. 1 in the configuration of an external communication unit 240 and a database update control unit 260. Hereinafter, the communication control apparatus 200 according to the second embodiment will be described focusing on the different configuration.

The external communication unit 240 is a communication interface for connecting the communication control apparatus 200 to the center 500 directly or via a network. The external communication unit 240 of the present embodiment shows an example including the first communication unit 141, the second communication unit 142, the third communication unit 143, and the fourth communication unit 144 as a communication device. The first communication unit 141, the second communication unit 142, the third communication unit 143, and the fourth communication unit 144 are as described above. The external communication unit 240 outputs operation information indicating whether each of the first communication unit 141, the second communication unit 142, the third communication unit 143, and the fourth communication unit 144 is normally operating, to (the communication policy choosing and notification unit 124 of) the database update control unit 260.

The database update control unit 260 controls a process related to an update of the communicability information stored in the communicability database 122 of the communication control unit 120. The database update control unit 260 includes the update request integration unit 161 and an update data acquisition unit 262.

The update data acquisition unit 262 collects information related to communicability such as a communicable band, a disconnection rate, and an error rate through the external communication unit 240 in communication to be performed between the application of the external communication application unit 130 and the center 500. The update data acquisition unit 262 generates DB update data for updating the communicability information stored in the communicability database 122 based on the collected information. The generated DB update data is output to the update request integration unit 161.

In the communication control apparatus 100 according to the first embodiment, the update data acquisition unit 162 performs data transmission to the center 500 and/or data reception from the center 500 via the external communication unit 140 based on the notification related to a communication system and communication timing, received from the communication control unit 120, and collects information needed to create DB update data. In contrast, in the communication control apparatus 200 according to the second embodiment, the update data acquisition unit 262 does not perform communication with the center 500 by itself to create DB update data, and creates DB update data by accumulating information that can be collected in communication to be performed between the application of the external communication application unit 130 and the center 500. With this configuration, data communication to be performed between the database update control unit 260 and the center 500 can be replaced with data communication to be performed between the external communication application unit 130 and the center 500, so it is possible to reduce data used by the communication control apparatus 200 to communicate with the center 500.

The route choosing unit 150 may make an inquiry about whether to change the current scheduled route (first route) to the alternative route (second route) proposed by the route consideration unit 123 of the communication control unit 120 to a user, such as a driver, via a human-machine interface device (not shown) and, only when the route choosing unit 150 obtains permission from the user, change the current scheduled route (first route) to the alternative route (second route). With this configuration, the user is able to understand that the scheduled route along which the communication control apparatus 100 moves will be changed or has been already changed, so the user does not feel a sense of distrust or a sense of strangeness.

In the above-described embodiments, the application in which a communication need of the external communication application unit 130 is generated needs to transmit data to the external communication unit 140 or receive data from the external communication unit 140 each time a notification according to communication timing is provided from the communication policy choosing and notification unit 124. Alternatively, the communication control unit 120 may include a component that temporarily stores communication data and may collectively control transmission and reception of data between the external communication application unit 130 and the external communication unit 140. Thus, the application in which a communication need is generated is free from a communication system or communication timing and is able to temporarily keep all the data in the communication control unit 120 in advance or receive all the temporarily kept data from the communication control unit 120 at a time. Therefore, it is possible to reduce load on the application related to data transmission and reception processing.

Operation and Advantageous Effects

With the communication control apparatus according to the embodiments of the disclosure, the communicability information stored in the communicability database and at least associating a location connectable to the center with an available communication system is updated based on the scheduled route along which the communication control apparatus moves, and the requested update details. Thus, it is possible to suitably update information of missing portions, information of portions of old creation dates, and the like in the communicability information stored in the communication control apparatus even during moving of the communication control apparatus.

With this control, it is possible to accurately estimate in advance a communication system appropriate for use in communication between the application and the center during moving of the communication control apparatus (or the vehicle on which the communication control apparatus is mounted) based on a scheduled route, occasionally updated latest communicability information, and communication details requested by a communication need generated in the application implemented in the communication control apparatus. Therefore, it is possible to avoid, for example, a situation in which the communication control apparatus is not able to connect to the center at a scheduled location, a situation in which the communication control apparatus is not able to obtain a desired communication band even when being able to connect to the center, or a situation in which a communication cost to be spent in connection with the center unnecessarily increases.

The embodiments of the disclosure are described above; however, the disclosure may be regarded as a communication control apparatus, a battery control method to be executed by the communication control apparatus including a processor and a memory, a control program for executing the battery control method, a non-transitory computer-readable storage medium storing the control program, and a vehicle equipped with a power supply system including the communication control apparatus.

The disclosure is usable in a communication control apparatus or the like connectable to an external device by using a plurality of communication systems.

What is claimed is:

1. A communication control apparatus configured to be connected to an external device by using a plurality of communication systems, the communication control apparatus comprising:
    a storage unit configured to store communicability information associating a location with a communication system available at the location out of the communication systems, the location being a location where the communication control apparatus is connectable to the external device;
    an update control unit configured to control an update of the communicability information based on a request from at least one of the communication control apparatus and the external device;
    an acquisition unit configured to acquire a first route as a scheduled route along which the communication control apparatus moves;
    a control unit configured to control communication between the communication control apparatus and the external device during moving of the communication control apparatus in order for the update control unit to control the update of the communicability information, based on the first route, the communicability information, and a communication detail requested by the communication control apparatus and the external device; and
    a communication unit configured to perform communication between the communication control apparatus and the external device in accordance with the control of the control unit, the external device being configured to collect data required for the update of the communicability information, wherein
    when the communication control apparatus moves along the first route, the control unit is configured to determine whether a portion of the data required for the update of the communicability information is unavailable for collection from the external device,
    when a determination is made that there is an unavailable portion of the communicability information, the external device collects the unavailable portion from another communication control apparatus,
    the update control unit configured to:
        collect the data required for the update of the communicability information through communication between the communication control apparatus and the external device; and
        control the update of the communicability information based on the collected data.

2. The communication control apparatus according to claim 1, wherein:
    the communication detail includes at least one of a communication location, a passage speed, a communication data amount, the communication system, and weather, the communication location indicating one or more portions to be updated in the communicability information; and
    the control unit is configured to control communication between the communication control apparatus and the external device such that the communication detail is satisfied.

3. The communication control apparatus according to claim 1, wherein, when a plurality of requests is generated from the communication control apparatus and the external device, the update control unit is configured to control an update of the communicability information by integrating the requests together.

4. The communication control apparatus according to claim 1, wherein, when a request is generated from the external device, the update control unit is configured to transmit update data of the communicability information to the external device, the communicability information being generated based on the collected data.

5. The communication control apparatus according to claim 4, wherein the external device is configured to distribute the update data to an apparatus different from the communication control apparatus, the update data being received from the update control unit.

6. The communication control apparatus according to claim 1, further comprising:
    a route consideration unit configured to propose a second route different from the first route based on the first route, the communicability information, and the communication detail, wherein
    the control unit is configured to, when the control unit determines that the second route satisfies a predetermined condition required for the scheduled route along which the communication control apparatus moves, change the scheduled route from the first route to the second route and control communication between the update control unit and the external device.

7. The communication control apparatus according to claim 6, wherein the second route is a route having a higher efficiency in updating the communicability information than the first route.

8. The communication control apparatus according to claim 6, wherein the predetermined condition required for the scheduled route has at least one of arrival time at a destination point of the scheduled route and a moving cost to the destination point.

9. The communication control apparatus according to claim 1, wherein, in the communicability information, at least one of time, weather, a passage speed, a communication band, an electric power required for communication, a disconnection rate of communication, and an error rate of communication is further associated with the location together with the communication system.

10. A communication control method that is executed by one or more processors in a computer of a communication control apparatus configured to be connected to an external device by using a plurality of communication systems, the communication control method comprising:
    requesting an update of communicability information from at least one of the communication control apparatus and the external device by using the communicability information, the communicability information associating a location with a communication system available at the location out of the communication systems, the location being a location where the communication control apparatus is connectable to the external device;
    acquiring a first route as a scheduled route along which the communication control apparatus moves;
    controlling communication between the communication control apparatus and the external device during moving of the communication control apparatus in order to control the update of the communicability information, based on the first route, the communicability information, and a communication detail requested by the communication control apparatus and the external device, the external device being configured to collect data required for the update of the communicability information;
    when the communication control apparatus moves along the first route, determining whether a portion of the data required for the update of the communicability information is unavailable for collection from the external device, wherein
    when a determination is made that there is an unavailable portion of the communicability information, the external device collects the unavailable portion from another communication control apparatus;
    collecting the data required for the update of the communicability information by performing communication between the communication control apparatus and the external device in accordance with a control of communication; and
    controlling the update of the communicability information based on the collected data.

11. A non-transitory storage medium storing instructions executable on one or more processors in a computer of a communication control apparatus configured to be connected to an external device by using a plurality of communication systems, the instructions causing the one or more processors to execute functions, the functions comprising:
    requesting an update of communicability information from at least one of the communication control apparatus and the external device by using the communicability information, the communicability information associating a location with a communication system available at the location out of the communication systems, the location being a location where the communication control apparatus is connectable to the external device;
    acquiring a first route as a scheduled route along which the communication control apparatus moves;
    controlling communication between the communication control apparatus and the external device during moving of the communication control apparatus in order to control the update of the communicability information, based on the first route, the communicability information, and a communication detail requested by the communication control apparatus and the external device, the external device being configured to collect data required for the update of the communicability information;
    when the communication control apparatus moves along the first route, determining whether a portion of the data required for the update of the communicability information is unavailable for collection from the external device, wherein
    when a determination is made that there is an unavailable portion of the communicability information, the external device collects the unavailable portion from another communication control apparatus;
    collecting the data required for the update of the communicability information by performing communication between the communication control apparatus and the external device in accordance with a control of communication; and
    controlling the update of the communicability information based on the collected data.

12. The communication control apparatus according to claim 1, wherein the other communication control apparatus from which the external device collects the unavailable portion is selected based on whether the other communication control apparatus satisfies predetermined criteria.

* * * * *